(12) United States Patent
Jeong et al.

(10) Patent No.: US 7,744,234 B2
(45) Date of Patent: Jun. 29, 2010

(54) BACKLIGHT ASSEMBLY AND LIQUID CRYSTAL DISPLAY HAVING THE SAME

(75) Inventors: Gi Ryong Jeong, Gycongsangbuk-do (KR); Hyung Yun Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/819,940

(22) Filed: Jun. 29, 2007

(65) Prior Publication Data

US 2008/0002094 A1    Jan. 3, 2008

(30) Foreign Application Priority Data

Jun. 30, 2006    (KR)    ........................ 10-2006-0060074

(51) Int. Cl.
  *G09F 13/08* (2006.01)
  *G09F 13/10* (2006.01)
(52) U.S. Cl. .................... 362/97.4; 362/97.1; 362/97.2; 349/58
(58) Field of Classification Search .................... 362/97, 362/632–634, 97.1, 97.2, 97.4; 349/58, 60
  See application file for complete search history.

(56) References Cited

U.S. PATENT DOCUMENTS

| | | | |
|---|---|---|---|
| 6,806,921 B2 * | 10/2004 | Nishida et al. | 362/632 |
| 2005/0212991 A1 * | 9/2005 | Sugawara | 349/58 |

* cited by examiner

*Primary Examiner*—Stephen F Husar
(74) *Attorney, Agent, or Firm*—McKenna Long & Aldridge LLP

(57) ABSTRACT

A backlight assembly is suitable for preventing generation of foreign materials. The backlight assembly comprises a reflector on a bottom cover, a set of optical sheets supported by the bottom cover, stoppers on opposite edges of the bottom cover to prevent movement of the optical sheet set, and supports extending from the reflector at least partially contacting inner sides of the first stoppers.

6 Claims, 7 Drawing Sheets

BACKLIGHT ASSEMBLY AND LIQUID CRYSTAL DISPLAY HAVING THE SAME

This application claims the benefit of Korean Patent Application No. 2006-0060074, filed on Jun. 30, 2006, which is hereby incorporated by reference for all purposes as if fully set forth herein.

BACKGROUND OF THE INVENTION

1. Field of the Invention

The present invention relates to a backlight assembly. More particularly, the present invention relates to a backlight assembly and a liquid crystal display having the same, which may prevent defects caused by foreign materials.

2. Discussion of the Related Art

Typically, liquid crystal displays (LCDs) show a tendency that their application fields are gradually increased due to the characteristics of light weight, thin thickness, low-power-consumption driving, and so on. Owing to this tendency, the LCDs are applied to office automation equipment, audio/video equipment, and so on. Meanwhile, the LCDs adjust an amount of transmitted light on the basis of image signals applied to a plurality of control switches arranged in a matrix pattern, thereby displaying a desired image on a screen.

The LCDs require a backlight assembly, because they are not spontaneous light-emitting displays. The backlight assembly is divided into a direct type and an edge type according to the position of a light source. The edge-type backlight assembly comprises a light source disposed at the edge of a flat panel, and a light guide plate guiding light from the light source to the front of a liquid crystal panel.

Meanwhile, the direct-type backlight assembly has a plurality of light sources disposed at the rear of a liquid crystal panel. The light sources directly irradiate light throughout the rear of the liquid crystal panel. The direct-type backlight assembly having the light sources can further increase brightness and a light emitting area, compared to the edge-type backlight assembly. The direct-type backlight assembly includes optical sheets that diffuse and collect the light from the light sources. These optical sheets are supported by supporter sides.

An LCD having this direct-type backlight assembly is constructed as in FIGS. 1 and 2. FIG. 1 is an exploded perspective view illustrating a related direct-type LCD, and FIG. 2 is a detailed view illustrating the state in which optical sheets are placed on the bottom cover in part A of FIG. 1.

As illustrated in FIGS. 1 and 2, the related LCD includes a liquid crystal panel 10 displaying an image, and a backlight assembly 20 supplying light.

The backlight assembly 20 includes a plurality of light sources 60 that emit light, a reflector 70 that is disposed at the rear of the light sources 60 and reflects the light, and optical sheets 30 disposed at the front of the light sources 60 and diffusing and collecting the light.

The backlight assembly 20 further includes first and second supporter sides 50A and 50B that are disposed on opposite sides of the light sources 60 and support opposite sides of the optical sheets 30, and a bottom cover 80 that is disposed at the rear of the reflector 70. The first and second supporter sides 50A and 50B are made of a molding, protect opposite ends of the light sources 60, and support the optical sheets 30.

The first and second supporter sides 50A and 50B are provided thereon with first and second stoppers 51A and 51B, which prevent the optical sheets 30 from moving in the direction of line X-X'. Meanwhile, each optical sheet 30 is provided with first and second guide recesses 31A and 31B at the positions corresponding to the first and second stoppers 51A and 51B.

The bottom cover 80 is provided, at opposite edges thereof, with third and fourth stoppers 81A and 81B, which protrude to prevent the optical sheets 30 from moving in the direction of line Y-Y'. The bottom cover 80 is made of metal material, which can increase durability of the LCD.

Although this related LCD having the direct-type backlight assembly includes the first and second stoppers 51A and 51B of the first and second supporter sides 50A and 50B which guide the optical sheets 30 as well as the third and fourth stoppers 81A and 81B of the opposite edges of the bottom cover 80, foreign materials are generated by the friction when the third and fourth stoppers 81A and 81B integrated with the bottom cover 80 made of metal material are brought into contact with the opposite sides of the optical sheets 30.

The foreign materials enter into the backlight assembly 20 to be deposited on the light sources 60. The foreign materials deposited on the light sources 60 interrupt some of the light emitted from the light sources 60, so that black noise corresponding to a shape of each foreign material shows on a displayed image. For this reason, the LCD having the direct-type backlight assembly does inevitably deteriorate a quality of image.

SUMMARY OF THE INVENTION

Accordingly, the present invention is directed to a backlight assembly that substantially obviates one or more of the problems due to limitations and disadvantages of the related art, and a liquid crystal display having the same.

An advantage of the present invention is to provide a backlight assembly, which is suitable for preventing generation of foreign materials.

Another advantage of the present invention is to provide a liquid crystal display, which is suitable for improving a quality of image.

According to an aspect of the present invention, there is provided a backlight assembly, which includes a reflector disposed on a bottom cover, a set of optical sheets supported by the bottom cover, stoppers formed on opposite edges of the bottom cover in order to prevent movement of the optical sheet set, and supports extending from the reflector so as to at least partially come into contact with inner sides of the first stoppers.

According to another aspect of the present invention, there is provided a liquid crystal display, which includes: a backlight assembly including a plurality of light sources arranged on a reflector disposed on a bottom cover, a set of optical sheets supported by the bottom cover and diffusing and collecting light from the light sources, stoppers formed on opposite edges of the bottom cover in order to prevent movement of the optical sheet set, and supports extending from the reflector so as to at least partially come into contact with inner sides of the first stoppers; and a liquid crystal panel adjusting the light from the optical sheet set to display an image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention together with the description, and serve to explain the principle of the invention.

DETAILED DESCRIPTION OF THE ILLUSTRATED EMBODIMENTS

Figure 1:
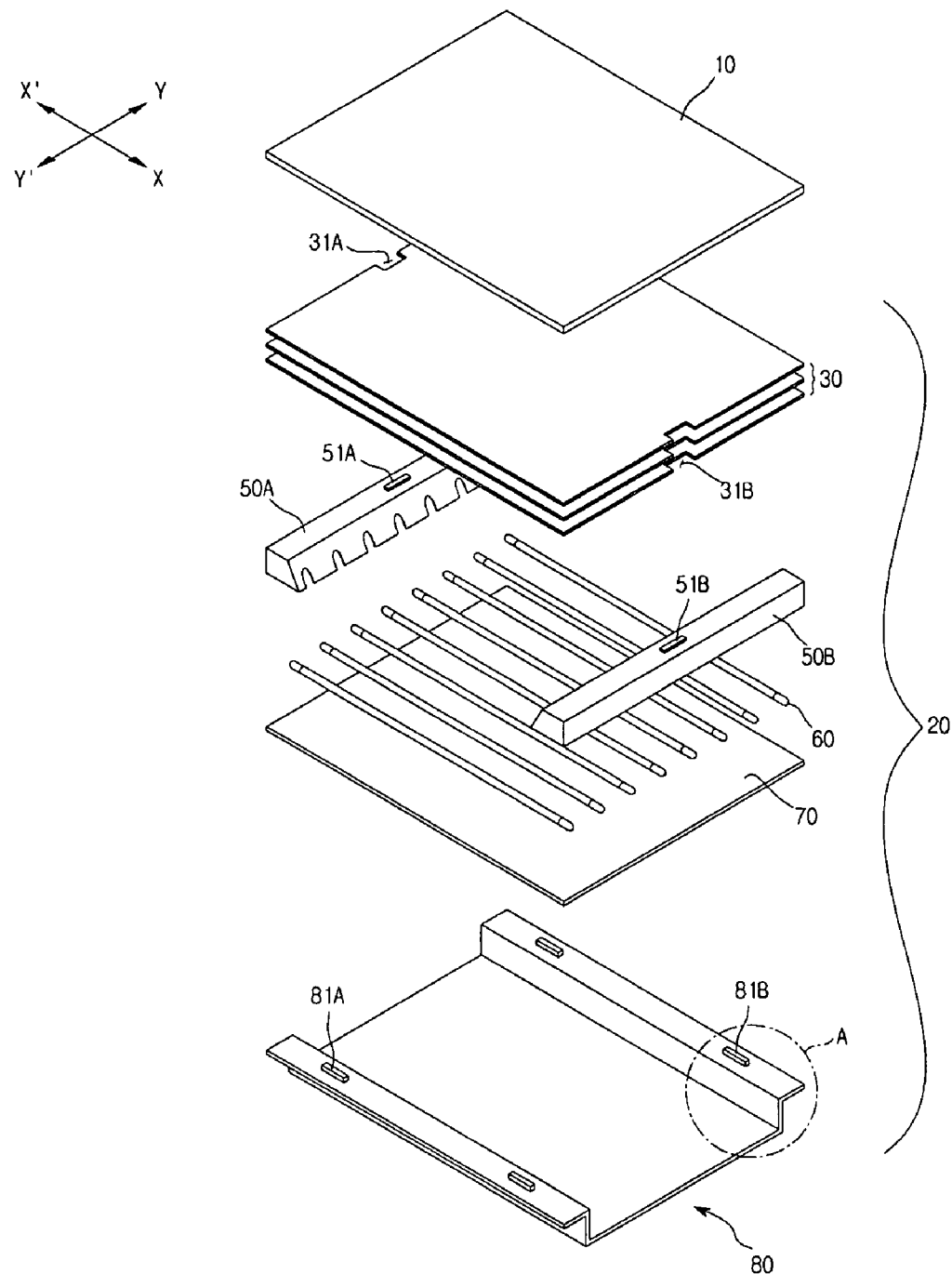
FIG. 1 is an exploded perspective view illustrating a related direct-type liquid crystal display (LCD)
Figure 2:
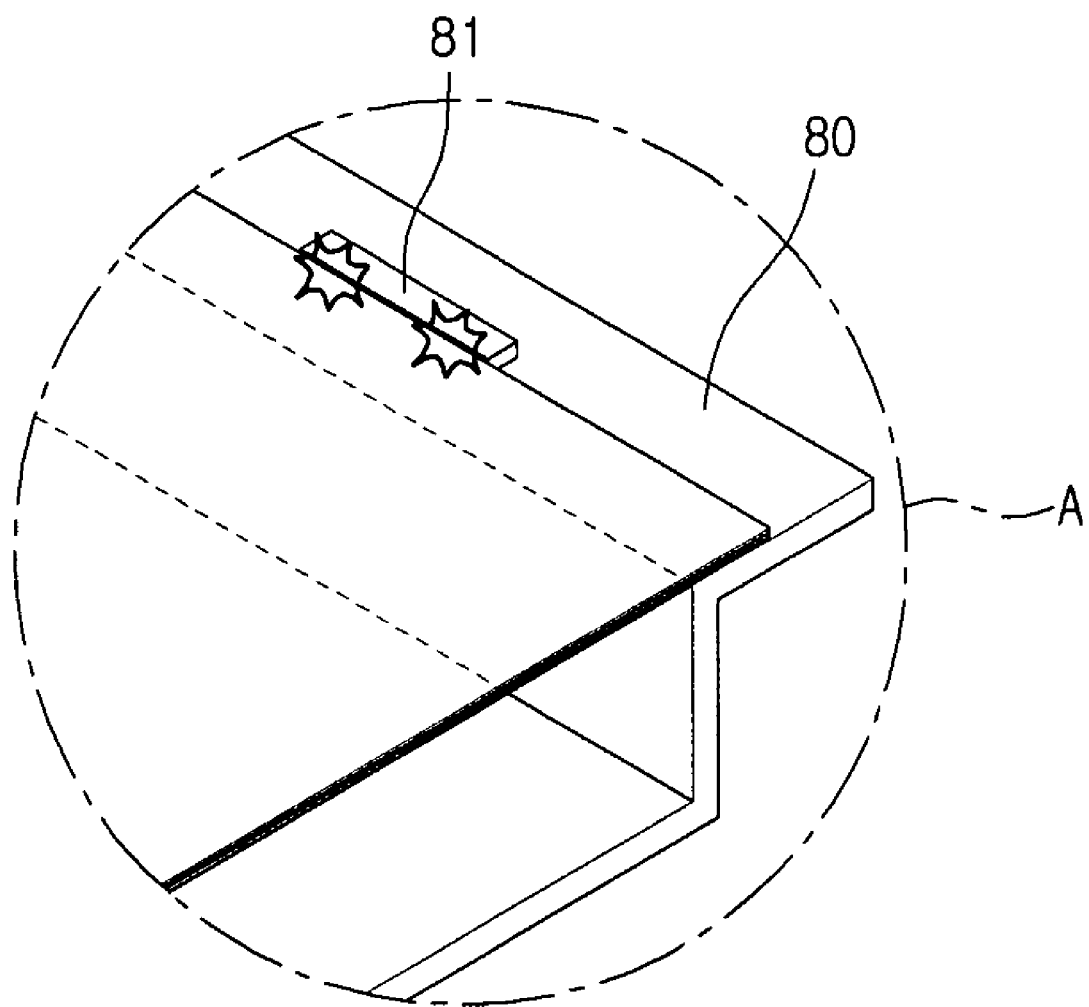
FIG. 2 is a detailed view illustrating the state in which a set of optical sheets is placed on the bottom cover in part A of FIG. 1.

Hereinafter, exemplary embodiments of the present invention will be described with reference to the accompanying drawings. In the drawings, components having the same operations and functions are designated by the same reference numerals.

Figure 3:
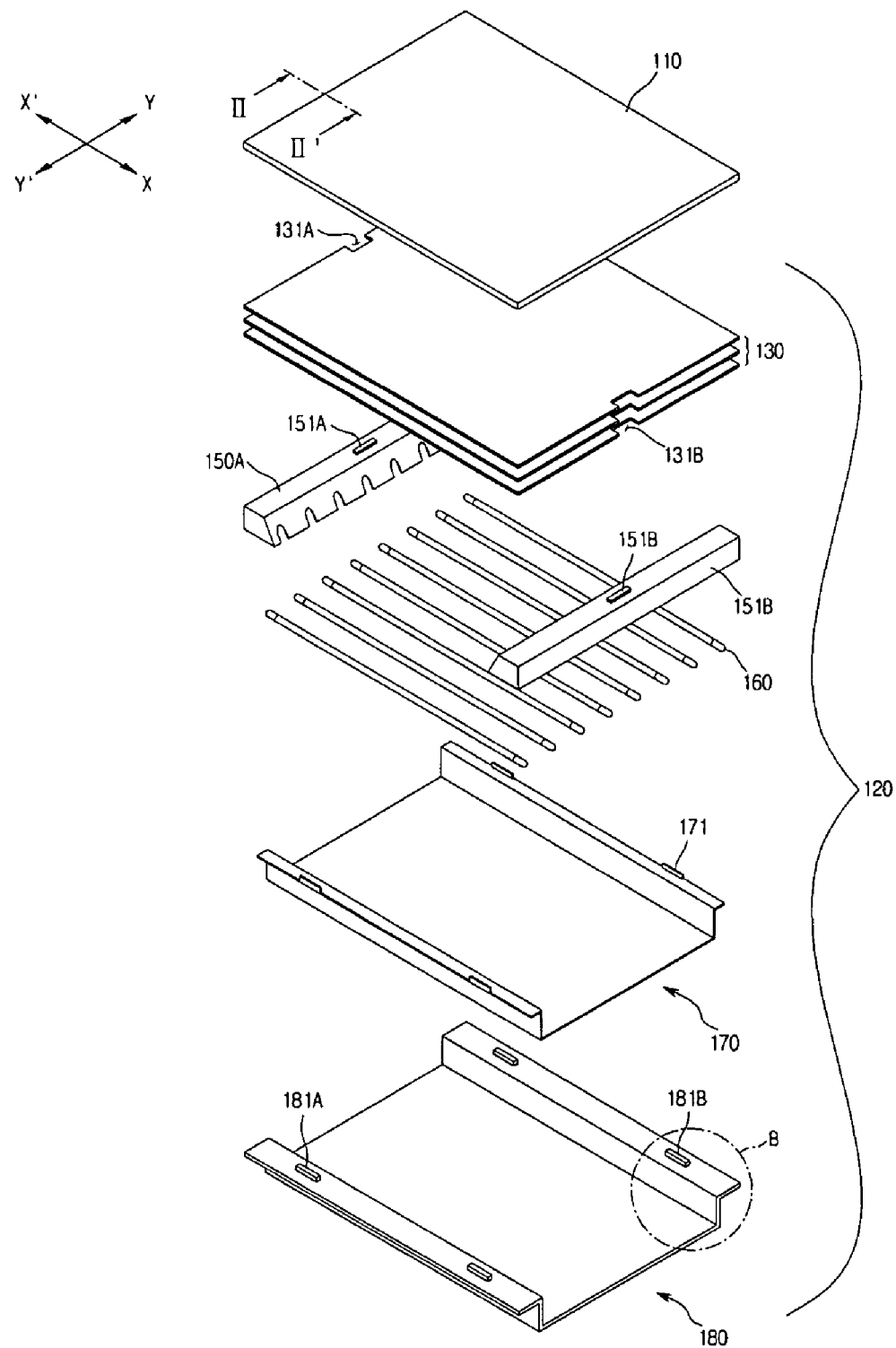
FIG. 3 is an exploded perspective view illustrating an LCD having a backlight assembly according to an embodiment of the present invention.
Figure 4:
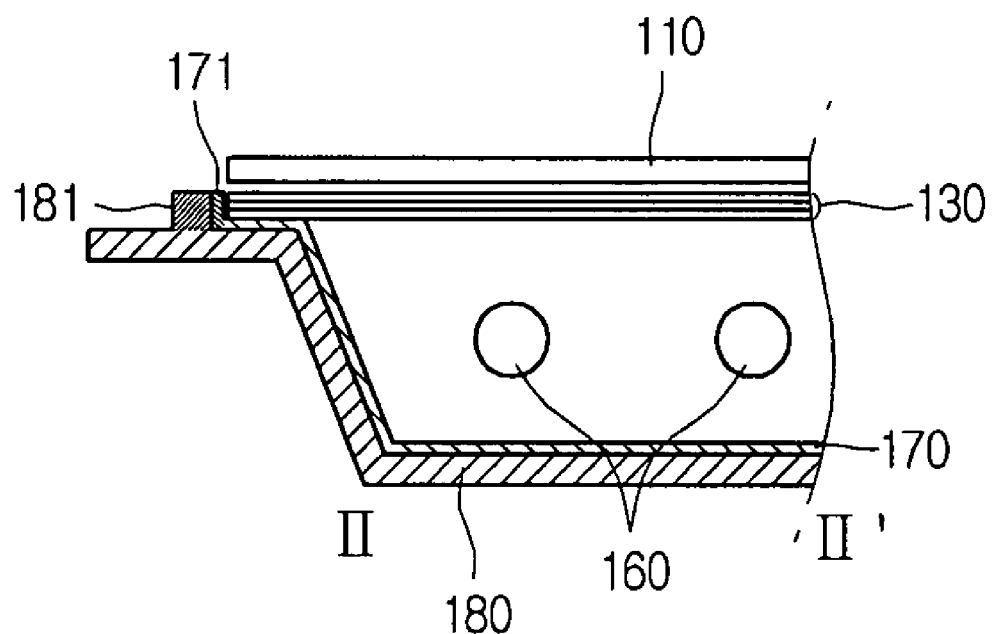
FIG. 4 is a sectional view taken along line I-I' of FIG. 3.
Figure 5:
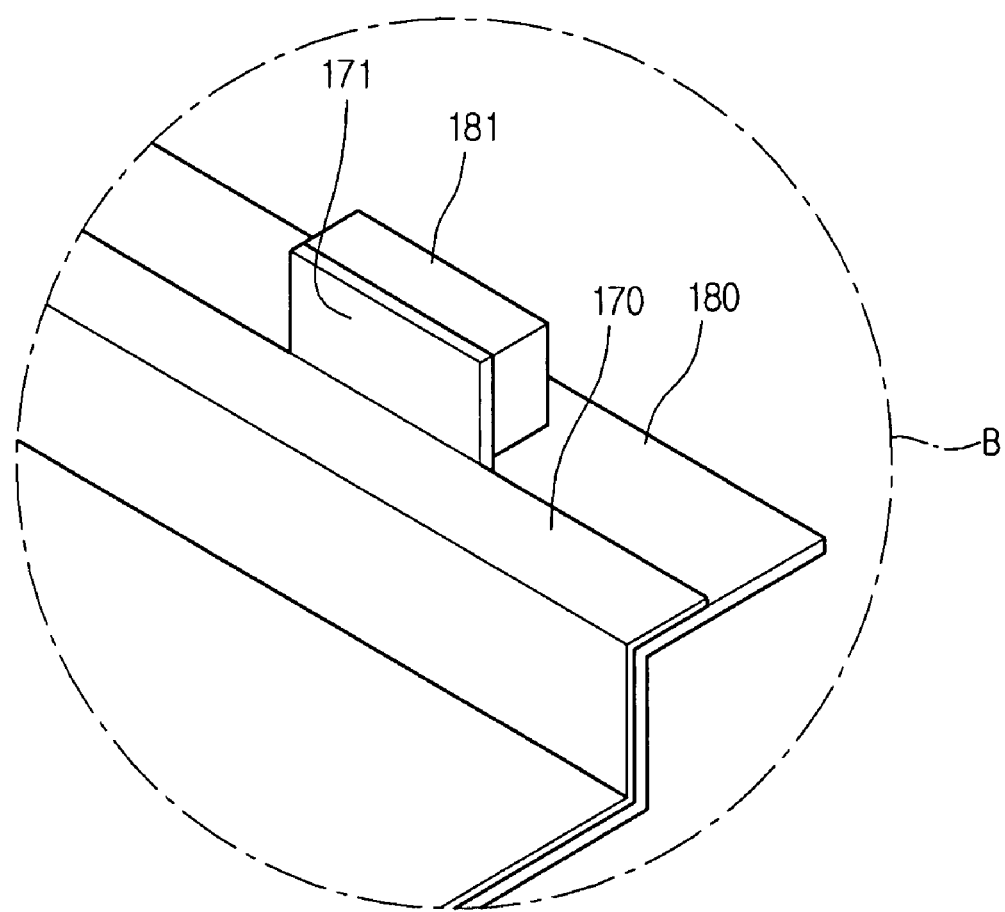
FIG. 5 is a detailed view illustrating the bottom cover and the reflector in part B of FIG. 3.

FIG. 3 is an exploded perspective view illustrating a liquid crystal display (LCD) using a direct-type backlight assembly according to an embodiment of the present invention. FIG. 4 is a sectional view taken along line I-I' of FIG. 3. FIG. 5 is a detailed view illustrating the bottom cover and the reflector in part B of FIG. 3.

Referring to FIGS. 3, 4 and 5, the LCD includes a liquid crystal panel 110 displaying an image, and a backlight assembly 120 irradiating light to the rear of the liquid crystal panel 110. The liquid crystal panel 110 may include a thin film transistor (TFT) array substrate and a color filter substrate, which are bonded together at a predetermined interval (i.e. a cell gap). The TFT array substrate and the color filter substrate have a liquid crystal layer interposed therebetween.

The backlight assembly 120 includes a reflector 170 disposed on a bottom cover 180, a plurality of light sources 160 disposed substantially in parallel on the reflector 170 at regular intervals, first and second supporter sides 150A and 150B disposed on opposite ends of the light sources 160, and a set of optical sheets 130 disposed on the first and second supporter sides 150A and 150B that diffuse and collect the light.

Although not illustrated in detail, the optical sheet set 130 may include a diffusion sheet diffusing the light, a prism sheet collecting the light, and a protection sheet protecting the prism sheet. The diffusion sheet may be made of plastic such as polymethylacrylate (PMMA), resin, or glass. Further, the diffusion sheet may be formed in a flat type or in a wedge type. This diffusion sheet is disposed on the first and second supporter sides 150A and 150B, and supports the prism and protection sheets.

The first and second supporter sides 150A and 150B may be made of poly carbonate (PC) based material. The first and second supporter sides 150A and 150B are provided thereon with first and second stoppers 151A and 151B for preventing the optical sheet set 130 from moving in the direction of line X-X'.

The optical sheet set 130 is provided with first and second guide recesses 131A and 131B on opposite sides thereof, which correspond to first and second supporter sides 150A and 150B, so as to correspond to the first and second stoppers 151A and 151B.

When the first and second stoppers 151A and 151B are fitted into the first and second guide recesses 131A and 131B, the first and second supporter sides 150A and 150B are meshed with optical sheet set 130, and thus the optical sheet set 130 is prevented from moving in the direction of line X-X'. Further, the first and second stoppers 151A and 151B and the first and second guide recesses 131A and 131B may be formed to maintain an interval therebetween constant in consideration of contraction/expansion of the optical sheet set 130 which is caused by heat.

The bottom cover 180 is provided with third and fourth stoppers 181A and 181B, which are for preventing the optical sheet set 130 from moving in the direction of line Y-Y' in a protruding shape, on opposite protruding edges thereof.

The reflector 170 extends to the third and fourth stoppers 181A and 181B of the bottom cover 180 in a step shape. The reflector 170 includes first and second supports 171A and 171B, which are disposed between the third and fourth stoppers 181A and 181B and are in contact with the opposite sides of the optical sheet set 130. In this case, the first and second supports 171A and 171B can be formed in the same shape of the third and fourth stoppers 181A and 181B. The reflector 170 can be made of plastic such as polyethylene terephthalate (PET). The first and second supports 171A and 171B are also made of plastic such as PET. Furthermore, the first and second supports 171A and 171B can be simultaneously made when the reflector 170 is manufactured, and be integrally formed with the reflector 170. The first and second supports 171A and 171B come into contact with the inner sides of the third and fourth stoppers 181A and 181B, so that the opposite sides of the optical sheet set 130 are prevented from being directly brought into contact with the third and fourth stoppers 181A and 181B.

As described above, the direct-type backlight assembly according to an embodiment of the present invention includes the reflector 170 having the first and second supports 171A and 171B that correspond to the inner sides of the third and fourth stoppers 181A and 181B formed on the opposite edges of the bottom cover 180, thereby preventing the optical sheet set 130 from being directly brought into contact with the bottom cover 180 prevent the generation of foreign materials. In the LCD using this direct-type backlight assembly as a light source, no black noise is generated by the foreign materials. As a result, the LCD using the direct-type backlight assembly can provide an improved quality of image.

Figure 6:
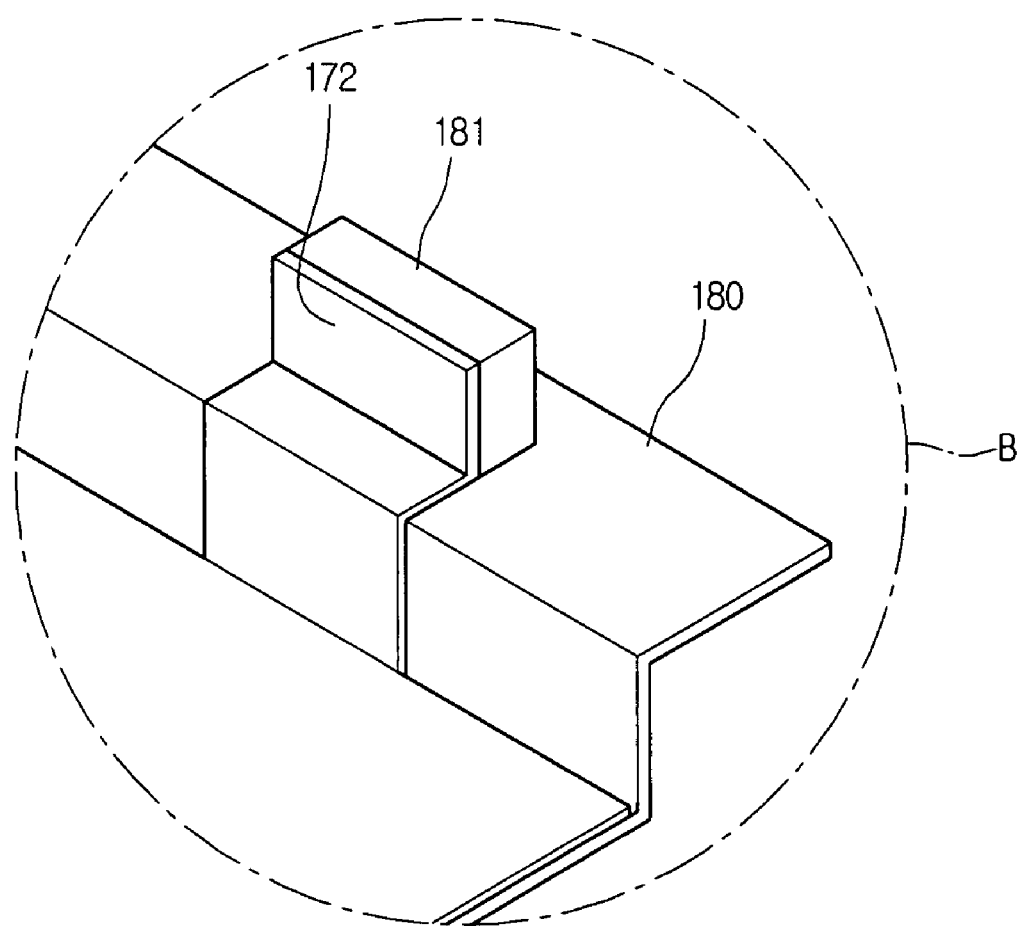
FIG. 6 is a detailed view illustrating another embodiment of the reflector of FIG. 3.

FIG. 6 is a detailed view illustrating another embodiment of the reflector 170 of FIG. 3. Referring to FIG. 6, the reflector 170 comprises a support 172 brought into surface contact with the inner side of the stopper 181 formed on a protruding edge of the bottom cover 180. The support 172 extends from the edge of the reflector 170 in part in a step shape. The support 172 has the same width as a length of the stopper 181. The support 172 having the same width as the stopper is brought into surface contact with the inner side of the stopper 181, so that the optical sheet set 130 placed on the bottom cover 180 is prevented from moving in the direction of line Y-Y'. In addition, the support 172 prevents the sides of the optical sheet set 130 from being brought into direct contact with the stoppers 181, and thus preventing the generation of the foreign materials. Accordingly, in the LCD, no black noise is generated by the foreign materials, and thus the image quality is ameliorated.

Figure 7:
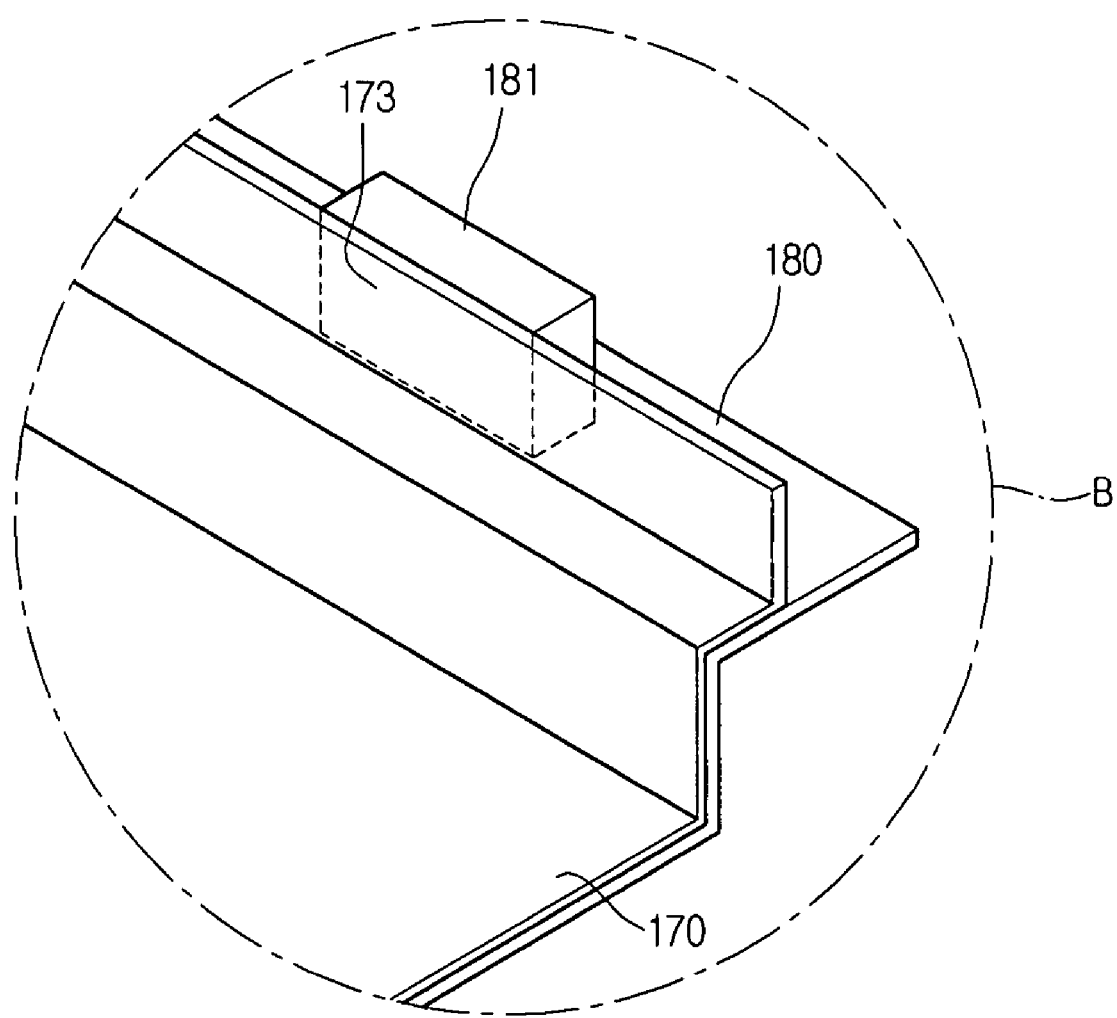
FIG. 7 is a detailed view illustrating yet another embodiment of the reflector of FIG. 3

FIG. 7 is a detailed view illustrating yet another embodiment of the reflector 170 of FIG. 3. The reflector 170 of FIG. 7 includes a support 173 extending from the edge thereof in a step shape. The support 173 brings part thereof into surface contact with the inner side of the stopper 181, so that the optical sheet set 130 placed on the bottom cover 180 is prevented from moving in the direction of line Y-Y'. In addition, the support 173 prevents the sides of the optical sheet set 130 from being brought into direct contact with the stoppers 181, and thus preventing the generation of the foreign materials. Accordingly, in the LCD, no black noise is generated by the foreign materials, and thus the image quality is ameliorated.

As described above, the direct-type backlight assembly according to the present invention prevents direct contact between the stoppers on the edges of the bottom cover and the optical sheet set using the reflector having an extending structure. Thus, the foreign materials cannot be generated by the friction between the stoppers and the optical sheet set.

Further, the LCD having the direct-type backlight assembly according to the present invention prevents the generation of the foreign materials, and thus prevents partial interruption of the light. As a result, in the LCD, the black noise similar to the foreign materials is not generated, and furthermore the image quality is ameliorated.

Although the invention has been described with reference to specific embodiments, it will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight assembly comprising:
    a reflector on a bottom cover;
    a set of optical sheets supported by the bottom cover;
    stoppers on opposite edges of the bottom cover to prevent movement of the optical sheet set; and
    supports extending from the reflector at least partially contacting inner sides of the first stoppers,
    wherein the supports contact the opposite sides of the optical sheets and each of the supports has a width greater than that of each of the stoppers.

2. The backlight assembly as claimed in claim 1, wherein the supports a step-shaped cross section.

3. The backlight assembly as claimed in claim 1, wherein the supports are integrally formed with the reflector.

4. A liquid crystal display comprising:
    a backlight assembly including a plurality of light sources arranged on a reflector disposed on a bottom cover, a set of optical sheets supported by the bottom cover to diffuse and collect light from the light sources, stoppers formed on opposite edges of the bottom cover to prevent movement of the optical sheet set, and supports extending from the reflector to at least partially contacting inner sides of the first stoppers; and
    a liquid crystal panel adjusting the light from the optical sheet set to display an image.
    Wherein the supports contact the opposite sides of the optical sheets and each of the supports has a width greater than that of the stoppers.

5. The liquid crystal display as claimed in claim 4, wherein the supports include a step-shaped cross section.

6. The liquid crystal display as claimed in claim 4, wherein the supports are integrally formed with the reflector.

* * * * *